US010640269B2

(12) United States Patent
Lumsden et al.

(10) Patent No.: US 10,640,269 B2
(45) Date of Patent: May 5, 2020

(54) METHOD FOR DETECTING A BREACH OF A BARRIER OR STOWAGE CONTAINER

(71) Applicant: The Boeing Company, Chicago, IL (US)

(72) Inventors: Jason S. Lumsden, Mill Creek, WA (US); Anika N. Tuba, Mill Creek, WA (US); Kathryn Kennedy, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 287 days.

(21) Appl. No.: 15/702,057

(22) Filed: Sep. 12, 2017

(65) Prior Publication Data
US 2019/0077559 A1    Mar. 14, 2019

(51) Int. Cl.
| B65D 55/02 | (2006.01) |
| B64D 11/06 | (2006.01) |
| B65D 43/16 | (2006.01) |
| B65D 85/18 | (2006.01) |
| B64F 5/60 | (2017.01) |

(52) U.S. Cl.
CPC ........ B65D 55/026 (2013.01); B64D 11/0631 (2014.12); B65D 43/16 (2013.01); B65D 85/18 (2013.01); B64F 5/60 (2017.01)

(58) Field of Classification Search
CPC ...... B65D 55/026; B65D 85/18; B65D 43/16; B64D 11/0631; B64F 5/60
See application file for complete search history.

(56) References Cited

U.S. PATENT DOCUMENTS 3,623,683 A * 11/1971 Bennett ................. B64D 11/00
                                                 244/122 A
4,462,501 A *  7/1984 Franchi ................ B65D 50/069
                                                 206/459.5

(Continued)

FOREIGN PATENT DOCUMENTS

| GB | 2546086 A * 7/2017 ......... B64D 11/0643 |
| WO | WO-2015189721 A2 * 12/2015 |

OTHER PUBLICATIONS

Specification and Drawings in copending U.S. Appl. No. 15/701,997, 45 pages.

(Continued)

Primary Examiner — Nimeshkumar D Patel
Assistant Examiner — Tania Courson
(74) Attorney, Agent, or Firm — MH2 Technology Law Group LLP

(57) ABSTRACT

A method for detecting tampering with a stowage container can include configuring the stowage container, the stowage container comprising a container housing and a barrier, wherein edges of the barrier overlap edges of the container housing to prevent access to an interior of the stowage container between the container housing and the barrier when the barrier is in a closed position. A tamper-evident device can be positioned such that the tamper-evident device is viewable from at least one predetermined eyepoint under an ambient light environment. The tamper-evident device can be configured to be inaccessible from an exterior of the stowage container and provides a distinct color contrast with the stowage container and an indication that tampering has occurred.

20 Claims, 7 Drawing Sheets

(56) References Cited

U.S. PATENT DOCUMENTS

| | | | |
|---|---|---|---|
| 4,535,903 A | 8/1985 | Franchi | |
| 4,585,123 A * | 4/1986 | Penry | G11B 33/10 |
| | | | 206/387.1 |
| 4,674,641 A * | 6/1987 | Rusinyak | B65D 55/026 |
| | | | 215/230 |
| 4,807,271 A | 2/1989 | Covington et al. | |
| 5,096,249 A * | 3/1992 | Hines | B60R 7/043 |
| | | | 224/275 |
| 6,902,453 B2 | 6/2005 | Switlik et al. | |
| 6,960,110 B2 * | 11/2005 | Hough | B63C 9/22 |
| | | | 206/807 |
| 7,178,867 B2 * | 2/2007 | Hough | B63C 9/22 |
| | | | 206/459.1 |
| 7,252,569 B2 | 8/2007 | Everhart et al. | |
| 7,913,870 B2 * | 3/2011 | Vovan | B65D 55/026 |
| | | | 206/459.1 |
| 7,976,101 B2 | 7/2011 | Wieland | |
| 8,292,223 B2 | 10/2012 | Lamoree et al. | |
| 8,678,493 B2 | 3/2014 | Lamoree et al. | |
| 10,144,515 B2 | 12/2018 | Le et al. | |
| 2003/0215162 A1 | 11/2003 | Switlik et al. | |
| 2005/0062319 A1 * | 3/2005 | Hough | B63C 9/22 |
| | | | 297/188.08 |
| 2008/0106127 A1 * | 5/2008 | Hough | B64D 11/06 |
| | | | 297/188.08 |
| 2009/0242695 A1 * | 10/2009 | Lamoree | B64D 11/06 |
| | | | 244/1 R |
| 2010/0012542 A1 * | 1/2010 | Methuen | A45C 13/00 |
| | | | 206/459.1 |
| 2013/0202230 A1 * | 8/2013 | Parttridge | A45C 15/00 |
| | | | 383/200 |
| 2013/0271299 A1 | 10/2013 | Lamoree et al. | |
| 2015/0034641 A1 * | 2/2015 | Aruga | B64D 11/0631 |
| | | | 220/214 |
| 2015/0038030 A1 | 2/2015 | White | |
| 2017/0225790 A1 * | 8/2017 | Ball | B64D 11/0631 |
| 2019/0077491 A1 * | 3/2019 | Schalla | B63C 9/23 |
| 2019/0152401 A1 * | 5/2019 | Gargano | B60R 7/04 |

OTHER PUBLICATIONS

Extended European Search Report dated Feb. 12, 2019 in related EP Application No. 18184405.1, 7 pages).

* cited by examiner

METHOD FOR DETECTING A BREACH OF A BARRIER OR STOWAGE CONTAINER

TECHNICAL FIELD

The present teachings relate to the field of aircraft emergency devices and, more particularly, to a stowage container including a breach detector that can be used, for example, to store an article such as a life vest under an aircraft seat.

BACKGROUND

Under United States federal regulations, no person may operate an airplane in any overwater operation unless it is equipped with a device such as a life preserver or flotation (hereinafter, "life vest") for each occupant. The life vest must be within easy reach of each seated occupant and readily removable from the airplane. In passenger aircraft, this requirement is typically satisfied by storing a life vest underneath each seat.

Each life vest can be stored within an under-seat stowage container. Once the life vest is placed within the stowage container, a door of the stowage container can be closed and fitted with a frangible closure or seal in an attempt to ensure that the stowage container contents have not been tapered with or removed, or that any foreign object or material has been placed within the stowage container. While the frangible closure should be sufficient to easily identify a stowage container that has been breached, it must allow easy entry into the stowage container to access the contents of the stowage container in case of emergency, but should not be replaceable by unauthorized personnel. Each frangible closure is periodically inspected by authorized aviation personnel to ensure that the stowage container has not been breached. Typically, an inspector checks each closure individually which can involve visual inspection as well as manual contact with the closure to ensure that it has not been removed and replaced. Once the frangible closure has been removed, it must be replaced with an unused seal.

A stowage container that allows for a more rapid and simplified inspection to detect a stowage container breach would be a welcome addition to the art. Further, a closure that mitigated the need to maintain a supply of replacement closures would be desirable.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for detecting tampering with a stowage container includes configuring the stowage container, the stowage container including a container housing and a barrier, wherein edges of the barrier overlap edges of the container housing to prevent access to an interior of the stowage container between the container housing and the barrier when the barrier is in a closed position. The method further includes positioning a tamper-evident device, such that the tamper-evident device is viewable from at least one predetermined eyepoint under an ambient light environment and configuring the tamper-evident device such that the tamper-evident device is inaccessible from an exterior of the stowage container, wherein the tamper-evident device provides a distinct color contrast with the stowage container and an indication that tampering has occurred.

The tamper-evident device can be configured against manipulation and can be manually inaccessible with the barrier is in the closed position and in an open position. Further the tamper-evident device can be positioned to be viewable from at least one predetermined eyepoint under an ambient light environment. The method can further include attaching the barrier and the tamper-evident device to an aircraft, and the tamper-evident device can be positioned to be viewable by a standing adult from an aisle of the aircraft. The positioning can further include positioning the tamper-evident device to be viewable by an adult in any posture from standing to bending.

In another implementation, a method for detecting tampering with a stowage container can include configuring the stowage container, the stowage container comprising a container housing and a barrier, wherein edges of the barrier overlap edges of the container housing to prevent access to an interior of the stowage container between the container housing and the barrier when the barrier is in a closed position, positioning an indicator assembly, such that the indicator assembly is viewable from a range of eyepoints under an ambient light environment, and configuring the indicator assembly such that the indicator assembly is inaccessible from an exterior of the stowage container and from interior of the stowage container such that the indicator assembly is inaccessible in both the closed position and an open position, wherein the indicator assembly provides a distinct color contrast with the stowage container and an indication that tampering has occurred.

The indicator assembly can be configured to be manually inaccessible from the exterior of the stowage container. The barrier and the indicator assembly can be attached to a seat of an aircraft. In an implementation, the positioning of the indicator assembly can include positioning the indicator assembly to be viewable by a standing adult from an aisle of an aircraft, for example, in any posture from standing to bending.

In an implementation, a method for detecting tampering with a stowage container can include providing a tamper-evident device of the stowage container such that the tamper-evident device is manually inaccessible when the stowage container is in an open position and when the stowage container is in a closed position, and configuring the tamper-evident device to provide a color contrast with the stowage container when tampering of the stowage container has occurred.

The method can further include positioning the tamper-evident device to be viewable from at least one predetermined eyepoint under an ambient light environment. The method can further include attaching the stowage container and the tamper-evident device to an aircraft, and can include positioning the tamper-evident device to be viewable by a standing adult from an aisle of the aircraft. The tamper-evident device can be positioned to be viewable by the standing adult from the aisle of the aircraft through a range of eyepoints without repositioning other seat system structures. The positioning of the tamper-evident device can further include positioning the tamper-evident device to be viewable by an adult in any posture from standing to bending. The positioning of the tamper-evident device can further include positioning the tamper-evident device to be viewable in ambient lighting without use of either a flashlight or a mirror. The method can further include attaching the barrier and the tamper-evident device to a seat of an aircraft.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
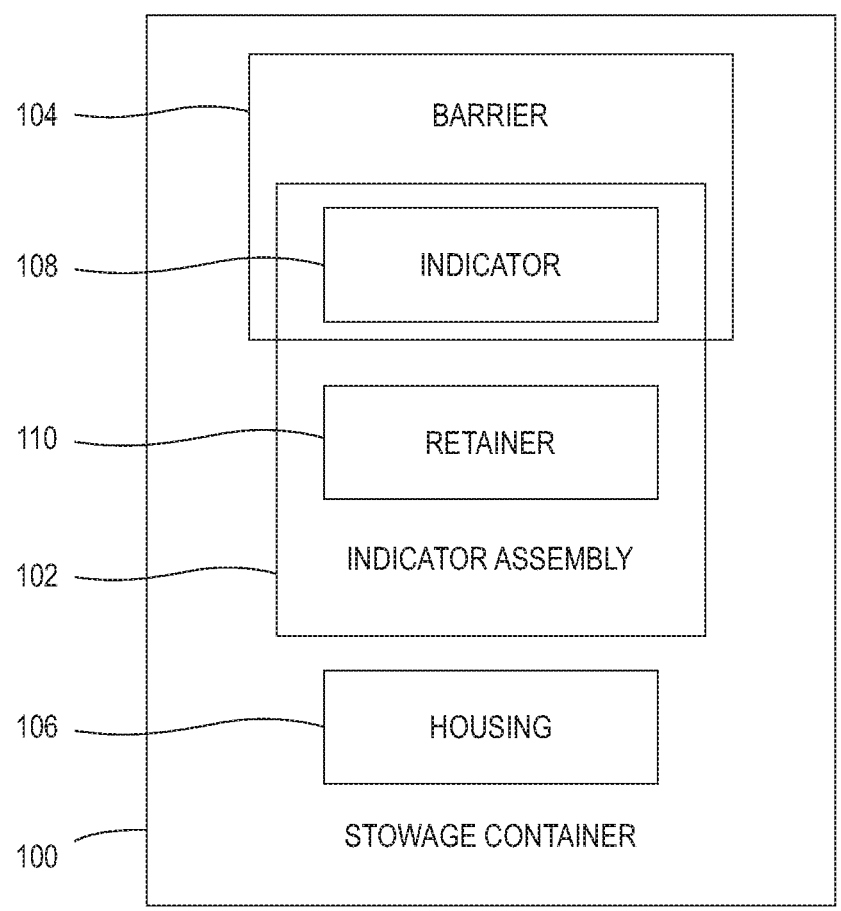
FIG. 1 is a functional block diagram of a stowage container including a barrier and an indicator assembly.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

One or more implementations of the present teachings can result in a more rapid and simplified inspection of a stowage container to determine whether the stowage container has been breached, opened, or tampered with compared to some prior systems. The inspection can be performed under ambient lighting (i.e., an ambient light environment), for example, ambient cabin lighting during inspection when the stowage container that can include safety equipment such as a life vest is used in a vehicle such as an aircraft, without the need for a separate tool such as a flashlight to aid viewing. When the stowage container is positioned, for example, under a passenger seat, a breached or unbreached state of the stowage container can be detected visually across a relatively wide field of view and from a predetermined eyepoint by a standing adult, for example from an aisle or within a row of an aircraft, without requiring an inspector to unduly bend, stoop, use a viewing aid such as a flashlight or a mirror, and without requiring an inspector to reposition other seat system structures such as an armrest, a seat cushion, a furniture panel, a dress or other cover, a strap, and a door. In an implementation, the breached or unbreached state of the stowage container can be detected visually by an adult across a range of postures from standing to bending. The field of view can include a predetermined viewing eyepoint or range of eyepoints, and can be determined, at least in part, by a pitch of a passenger seat and the design and location of the stowage container. For example, in an implementation, the passenger seat may have a pitch of less than 40 inches and the tamper-evident device, whether in a tampered or an un-tampered condition, can be visible through a 12 inch by 12 inch visual window that lies between a height of 34 inches and 57 inches from the floor, and no closer than 5 inches to the aisle-side armrest, and thereby provides the range of eyepoints. The stowage container can be or include a tamper-evident device (e.g., an indicator assembly) having a distinct color contrast with other stowage container portions that provides an indication whether tampering has occurred. The tamper-evident device can be configured against manipulation by an unauthorized person.

Various aspects of the present teachings are discussed relative to a stowage container having a space for stowage of an item, where the stowage container is secured by a barrier such as a door. In one implementation, the stowage container is a life vest stowage container for an aircraft and the item is a life vest. The stowage container can also be a stowage container for other vehicles, such as ships, boats, or trains, where securing safety equipment against tampering and ease of monitoring and detection of tampering is desired. It will be understood, however, that the present teachings can be applied to structures for use in fields other than aviation where detection of, or monitoring for, breach of a barrier other than a door, for example an access panel or other barrier that slides, pivots, rotates, or otherwise moves from a first position (e.g., closed, sealed, or armed) toward or into a second position (e.g., open, unsealed, breached, or unarmed), is desired. Further, the present teachings can be applied to container structures and container assemblies other than stowage containers. For purposes of this description the term "open" can include completely open or partially open unless otherwise specified.

FIG. 1 is a functional block diagram of a stowage container 100 according to an implementation of the present teachings. The stowage container 100 includes a tamper-evident device or indicator assembly 102, a barrier 104, and a housing 106. The housing 106 defines an interior of the stowage container 100 that can be used to stow a life vest or other article. The indicator assembly 102 includes an indicator 108 that can be positioned within the barrier 104. The indicator assembly 102 further includes a retainer 110. When the indicator 108 is in a first state (e.g., an armed state, sealed state, closed state, etc.) that indicates that the stowage container is sealed and the barrier 104 is in a first position (e.g., closed), the retainer 110 maintains the indicator 108 in the first state. Upon moving the barrier 104 toward a second position (e.g., open), the retainer 110 releases the indicator 108 to a second state (e.g., an unarmed state, unsealed state, breached state, open state, etc.) that indicates the stowage container 100 has been breached. Upon returning the barrier 104 to the first position, the indicator 108 remains in the second state until moved, for example, manually moving, by authorized personnel. It will be appreciated that the descriptive labels "first state" and "second state" are arbitrary and, alternatively, the first state can indicate an unarmed state, unsealed state, breached state, open state, etc., and the second state can indicate an armed state, sealed state, closed state, etc.

In an implementation, if the stowage container is opened, an indicator assembly adjusts from a first state (e.g., an armed state, sealed state, closed state, etc.) that indicates that the stowage container is sealed or unbreached, to a second state (e.g., an unarmed state, unsealed state, breached state, open state, etc.) that indicates the stowage container has been opened or breached. The indicator assembly thus provides a visual identifier that conveys to an observer whether the stowage container is sealed or has been breached. When in the second state, for example, the indicator assembly remains in the second state upon closing the door. The indicator assembly can be moved from the second state to the first state by authorized personnel. The indicator assembly of the present teachings does not require a supply of replacement closures to be maintained and stored, thereby reducing inventory and ongoing costs. In an implementation, the indicator is generally inaccessible to unauthorized personnel. The indicator does not inhibit opening of the barrier or prevent access to the interior of the stowage container.

For purposes of the present teachings, an indicator assembly that forms a part of the stowage container can include various subassemblies such as an indicator (e.g., a wafer, chip, token, etc.), a slot defined by a barrier, and a retainer. The indicator is a part of the indicator assembly and provides a visual cue regarding whether the stowage container has been breached.

Figure 2:
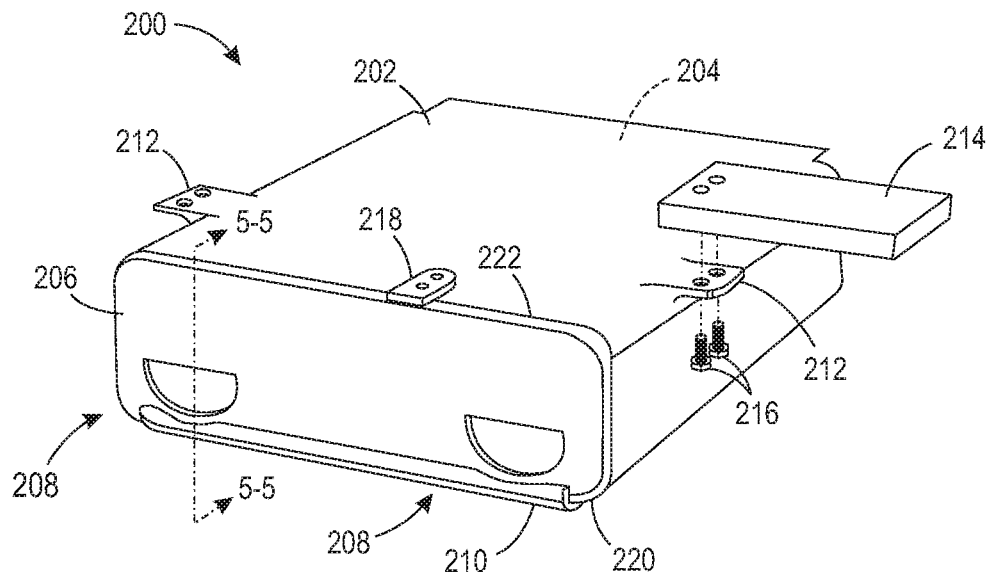
FIG. 2 is a perspective depiction of a stowage container according to an implementation of the present teachings in a closed, sealed, and/or unopened condition.
Figure 3:
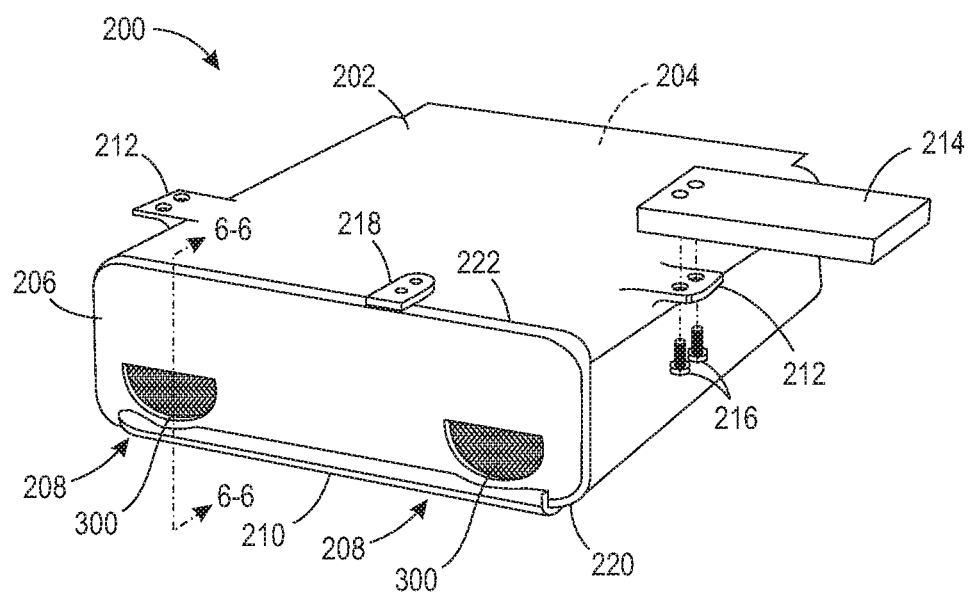
FIG. 3 is a perspective depiction of a stowage container according to the FIG. 2 implementation and in a closed and breached condition.
Figure 4:
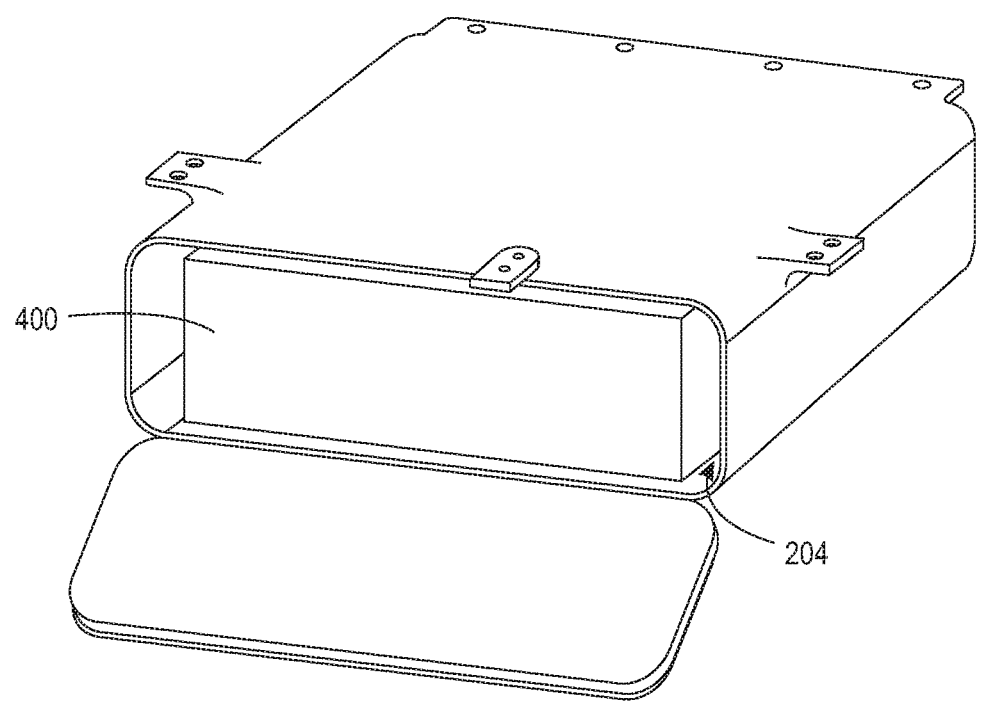
FIG. 4 is a perspective depiction of a stowage container in an open position according to an implementation of the present teachings.

FIGS. 2 and 3 are perspective depictions of a stowage container 200 according to an exemplary implementation of the present teachings. The stowage container 200 can include a frame or housing 202 that at least partially defines an internal stowage area or stowage compartment 204, a barrier 206 such as a door, and at least one indicator assembly 208, where the indicator assembly 208 is at least partially defined by, and encased within, the barrier 206. Two separate indicator assemblies 208 are depicted in the figures for purposes illustration, and stowage containers with only one indicator assembly or more than two indicator assemblies, and/or more than one door, are contemplated. The barrier 206 can be attached to the housing 202 with a moveable joint 210 such as a hinge that allows the barrier 206 to move between a first position (for example, a sealed, locked, or closed position as depicted in FIG. 2) that does not permit access to the stowage compartment 204 into a second position (for example, an unsealed, unlocked, or open position as depicted in FIG. 4) that permits access to the stowage compartment 204. In the implementation of FIG. 2, the stowage container 200 includes tabs 212 for attachment to an underside 214 of a passenger seat or another structure of a vehicle such as an aircraft using, for example, one or more fasteners 216 such as screws or bolts. As depicted in FIGS. 2 and 3, edges of the barrier 206 can overlap edges of the frame or housing 202, either inside or outside of the frame or housing 202, to prevent access to the stowage compartment 204 between the barrier 206 and the container frame or housing 202 without opening the barrier 206 and when the barrier 206 is in the closed position. The stowage container 200 can include other optional features such as a support 218 for releasably securing a device such as a radio frequency identification (RFID) device (not individually depicted for simplicity) to provide additional security measures. Additionally, the stowage container 200 can include other structures or features that have not been depicted for simplicity, while various depicted structures and features can be removed or modified.

FIG. 2 depicts the indicator assembly 208 in a first state which, in this example, indicates that the stowage container 200 has not been breached. In the FIG. 2 depiction, the moveable joint 210 is positioned along, and attached to, a first edge 220 of the barrier 206 and the housing 202, wherein a second edge 222 of the barrier 206 is positioned above the first edge 220. The barrier 206 can be releasably held in the closed position using one or more known techniques, such as one or more springs, pins, internal or external latches, etc. Upon moving the barrier 206 from the closed position toward the open position, the second edge 222 can become positioned at or below a level of the first edge 220 to allow access into the interior of the stowage container 200. Further, when the barrier 206 moves from the closed position toward the open position, the indicator assembly 208 adjusts from the first state that indicates the barrier 206 of the stowage container 200, and thus the stowage compartment 204, has not been breached or opened, to the second position as depicted in FIG. 3 that indicates the barrier 206 of the stowage container 200, and thus the stowage compartment 204, has been breached or opened. When the barrier 206 moves back toward, and into, the closed position, the indicator assembly 208 remains in the second state as depicted in FIG. 3. In this implementation, in the second state of FIG. 3, one or more tokens, chips, wafers, or another indicator 300, which are not visible when the indicator assembly 208 is in the first state of FIG. 2, become visible in the second state of FIG. 3. The indicator 300 can have a distinct color contrast with the rest of the stowage container, for example, with the barrier 206, and thus can provide a highly visible indication that tampering has occurred when in the second state of FIG. 3. In an implementation, the housing 202 and barrier 206 can be a dark color such as black, while the indicator(s) can be a color that contrasts with the housing 202 and barrier 206, for example, a color such as yellow, orange, red, or a combination of these and/or other colors. This color contrast helps ensure that the indicator is visible from an aisle or within a row of an aircraft, without requiring an inspector to unduly bend, stoop, use a viewing aid such as a mirror, or reposition other structures such as an armrest.

FIG. 4 depicts an item 400, for example, a life vest and/or another item, stored within the stowage compartment 204 of the stowage container 200.

Figure 5:
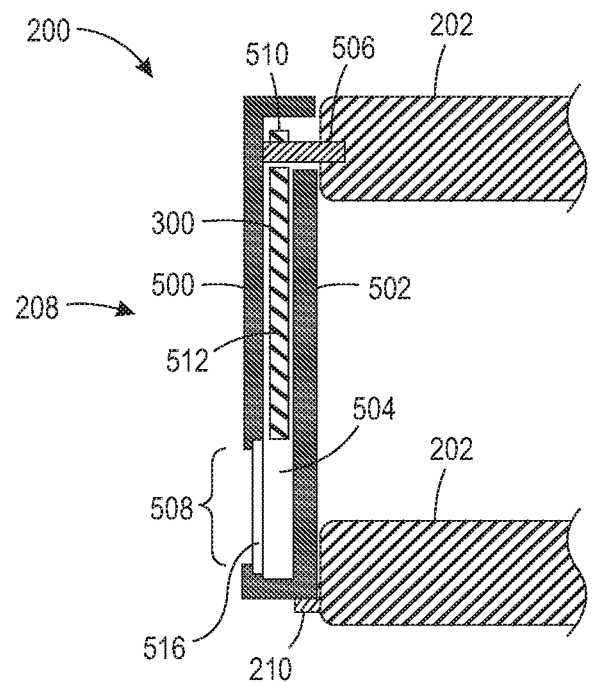
FIG. 5 is a cross section of an indicator assembly in a closed and sealed or armed position according to an implementation of the present teachings.
Figure 6:
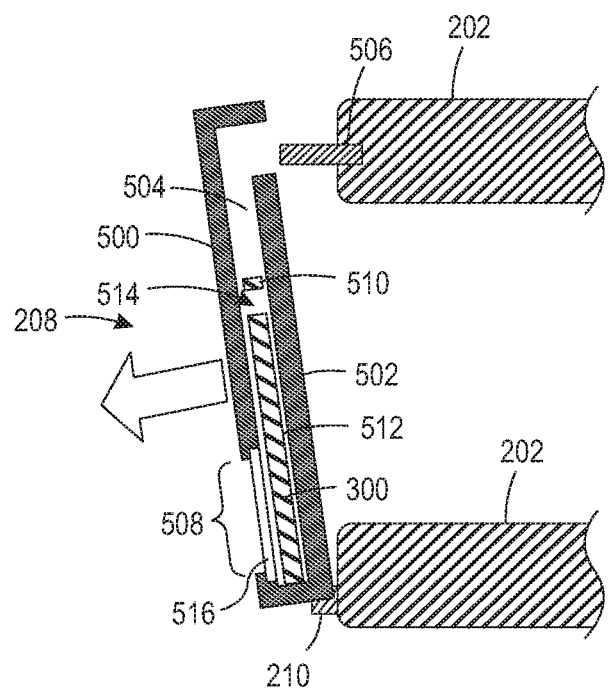
FIG. 6 is a cross section of the FIG. 5 implementation in a partially open and breached position.

Various mechanical mechanisms configured to perform as described above are contemplated. For example, FIGS. 5 and 6 are cross sections along 5-5 and 6-6 of FIGS. 2 and 3 respectively. FIGS. 2 and 5 depict the indicator assembly 208 of the stowage container 200 in a first position, such as a closed or sealed position, while FIGS. 3 and 6 depict the indicator assembly 208 of the stowage container 200 in a second position, such as an open or breached position.

In this implementation, the barrier 206 such as the door of FIGS. 2 and 3 is formed, at least in part, by a front panel 500 and a back panel 502 as depicted in FIGS. 5 and 6 that together define at least a portion of a slot 504 within the barrier 206, where the indicator 300 is positioned within the slot 504. Further, each indicator assembly 208 includes the indicator 300 and a post 506, where the post 506 is attached to, or formed as a part of, the housing 202. In this implementation, the post 506 provides at least a portion of a retainer configured to releasably hold the indicator 300 in the first state until the barrier 206 is moved toward the open position. The front panel 500 can further define an opening or window 508 through which the back panel 502 may or may not be visible when the indicator assembly 208 is in the first state (i.e., the sealed state) of FIG. 5 and through which the indicator 300 is visible when the indicator assembly 208 is in the second state (i.e., breached state) of FIG. 6. The indicator 300 includes a hook or arm 510 and a body 512, where the arm 510 extends from the body 512 and defines a notch 514.

When the stowage container 200 is in the closed position and the indicator assembly 208 is in the first state as depicted in FIGS. 2 and 5, the indicator 300 hangs by the arm 510 from the post 506. In the first state, the indicator 300 is held within an upper portion of the slot 504 and is not visible, or is only minimally visible, through the window 508, and the back panel 502 may or may not be visible through the window 508. As the barrier 206 moves from the closed position of FIG. 5 toward the open position as depicted in FIG. 6, the indicator 300, which is held within the slot 504 by the front panel 500 and the back panel 502, slides off of the post 506 and drops down toward or to a bottom portion of the slot 504 under the influence of gravity as depicted in FIG. 6, where the indicator 300 is visible through the window 508 and the back panel 502 may not be visible through the window 508.

Once the indicator assembly 208 moves from the first state of FIG. 5 to the second state of FIG. 6, closing the barrier 206 does not return the indicator assembly 208 to the first state, but rather the indicator assembly 208 remains in the second state and must be moved to the first state. In an implementation, the indicator 300 can be manufactured from a magnetic material. Additionally, the barrier 206 can include a cover 516, such as a transparent or translucent cover 516, that prevents manual manipulation of, or physical contact with, the indicator 300 through the window 508 from the exterior of the stowage container 200. The front panel 500, the back panel 502, and the cover 516, at least in part, render the indicator assembly 208, particularly the indicator 300 of the indicator assembly 208, inaccessible when the stowage container is in both the closed position (for example, FIGS. 2 and 3) and the open position (for example, FIG. 4).

While FIGS. 1-6 depict exemplary implementations for a stowage container 100/200 such as a life vest stowage container with a breach detection and indication system, it will be appreciated that other implementations are contemplated. For example, an indicator assembly as described herein, or a similar indicator assembly, can be used with an access panel that slides vertically, laterally, or obliquely.

Figure 7:
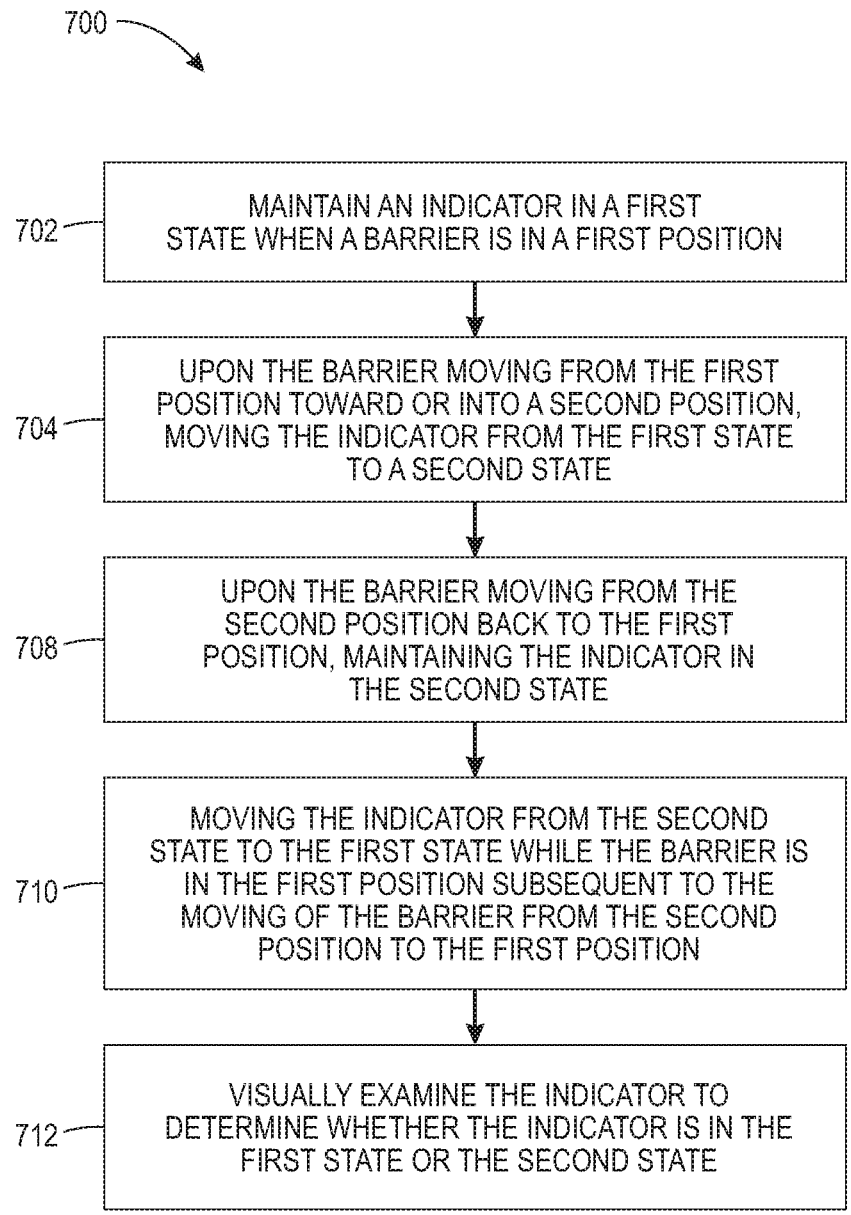
FIG. 7 is a flow chart or flow diagram of a method for detecting a breach of a barrier or stowage container and/or a method for operating a door.

A process or method 700 for detecting tampering with a stowage container is depicted in the flow chart or flow diagram of FIG. 7. The method 700 can proceed by operation or use of one or more of the structures depicted in the figures described above, and thus is described with reference to FIGS. 1-6; however, it will be appreciated that the method 700 is not limited to any particular structure or use unless expressly stated herein. It will be appreciated that while the method 700 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been depicted for simplicity, while other illustrated acts or events can be removed or modified.

The method 700 for detecting tampering with a structure such as a stowage container 100, 200 and/or a barrier 104, 206 such as a door, can begin by maintaining an indicator 108, 300 in a first state when the barrier 104, 206 is in a first position (for example, the position depicted in FIG. 2) as at 702. The first position can be, for example, a closed position. In an implementation, the stowage container 100, 200 can arrive from a supplier with the barrier 104, 206 in the first position and the indicator 108, 300 in the first state, or the barrier 104, 206 can be placed in the first position and/or the indicator 108, 300 can be moved into the first state by a vehicle manufacturer such as an aircraft manufacturer, an aircraft component supplier, or authorized aviation personnel. The first state of the indicator 108, 300 can be a state that indicates the barrier 104, 206 has not been breached.

At 704, upon the barrier 104, 206 moving from the first position toward or into a second position (for example, an open position as depicted in FIG. 4), the indicator 108, 300 moves from the first state into a second state. The barrier 104, 206 can be moved by an authorized person, for example during testing or demonstration, during placement of an item 400 into a stowage compartment 204, or to gain access to the item 400. In another aspect, the barrier 104, 206 can be moved by an unauthorized person.

Upon the barrier 104, 206 moving from the second position back to the first position, the indicator 108, 300 is maintained in the second state as at 708. The barrier 104, 206 can be moved by an authorized person, for example during testing or demonstration, during placement of an item 400 into a stowage compartment 204, or by an unauthorized person. Optionally, while the barrier 104, 206 is in the first position subsequent to the moving of the barrier 104, 206 from the second position to the first position, the indicator can be moved from the second state to the first state as at 710. At any time, for example during an inspection, testing, or demonstration, the indicator 108, 300 can be visually examined to determine whether the indicator 108, 300 is in the first state or the second state. The visual examination can be performed to determine whether the stowage container 100, 200 has been opened and/or tampered with and/or breached.

It will be appreciated that the method 700, including a partial or complete implementation of one, some, or all of the method acts 702-712, can describe a method for operating a stowage container and/or a barrier such as a door or panel.

Figure 8:
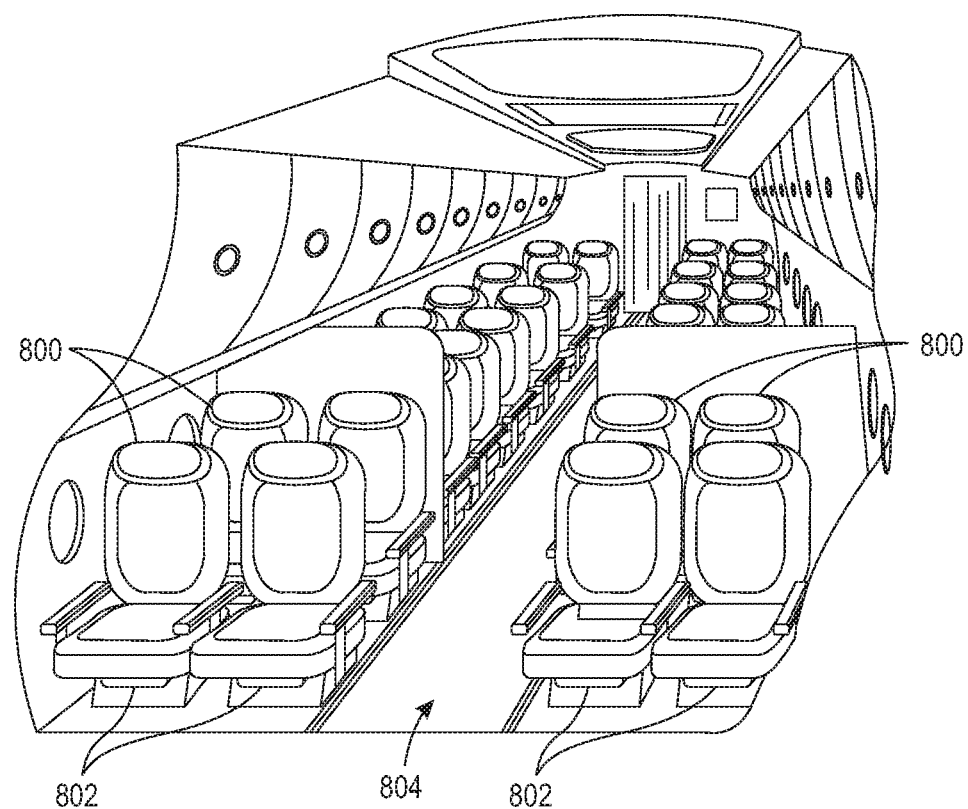
FIG. 8 is a perspective depiction of a plurality of seats and a plurality of rows of seats, with each seat having an attached stowage container according to an implementation of the present teachings.

FIG. 8 is a perspective depiction of a plurality of seats 800, wherein a separate stowage container or stowage container 802 has been attached to an underside of each seat 800. Each stowage container 802 can include an item such as a life vest (e.g., 400 of FIG. 4) within a stowage compartment. The plurality of seats 800 can be included as part of a vehicle such as a commercial or private aircraft 900 (FIG. 9) or another type of transportation vehicle. The aircraft 900 can include an aisle 804 from which each stowage container 802 is visible during inspection. That is, each stowage container 802 is visible by an inspector or other personnel from the aisle 804 through a field of view without having to enter the row of seats 800, where each row of seats includes one or more seats 800 and one or more stowage containers 802. Non-vehicle uses of a barrier having an indicator assembly as a breach detector in accordance with the present teachings are also contemplated.

Figure 9:
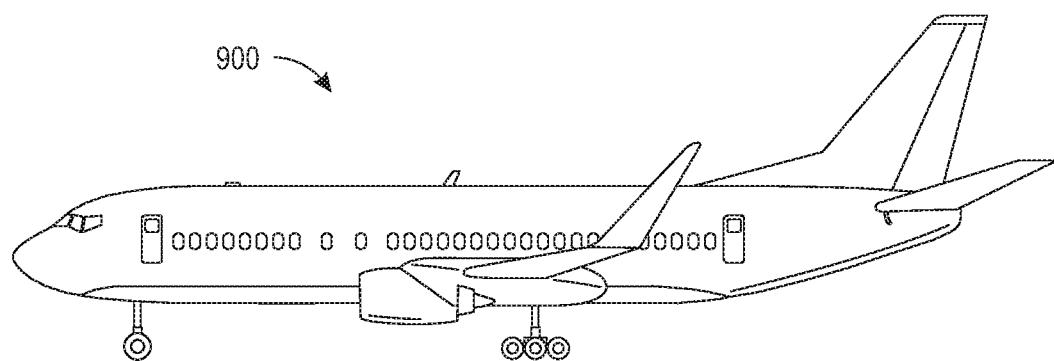
FIG. 9 is a side view of an aircraft that can include one or more seats, where each seat includes an attached stowage container according to an implementation of the present teachings.
Figure 10:
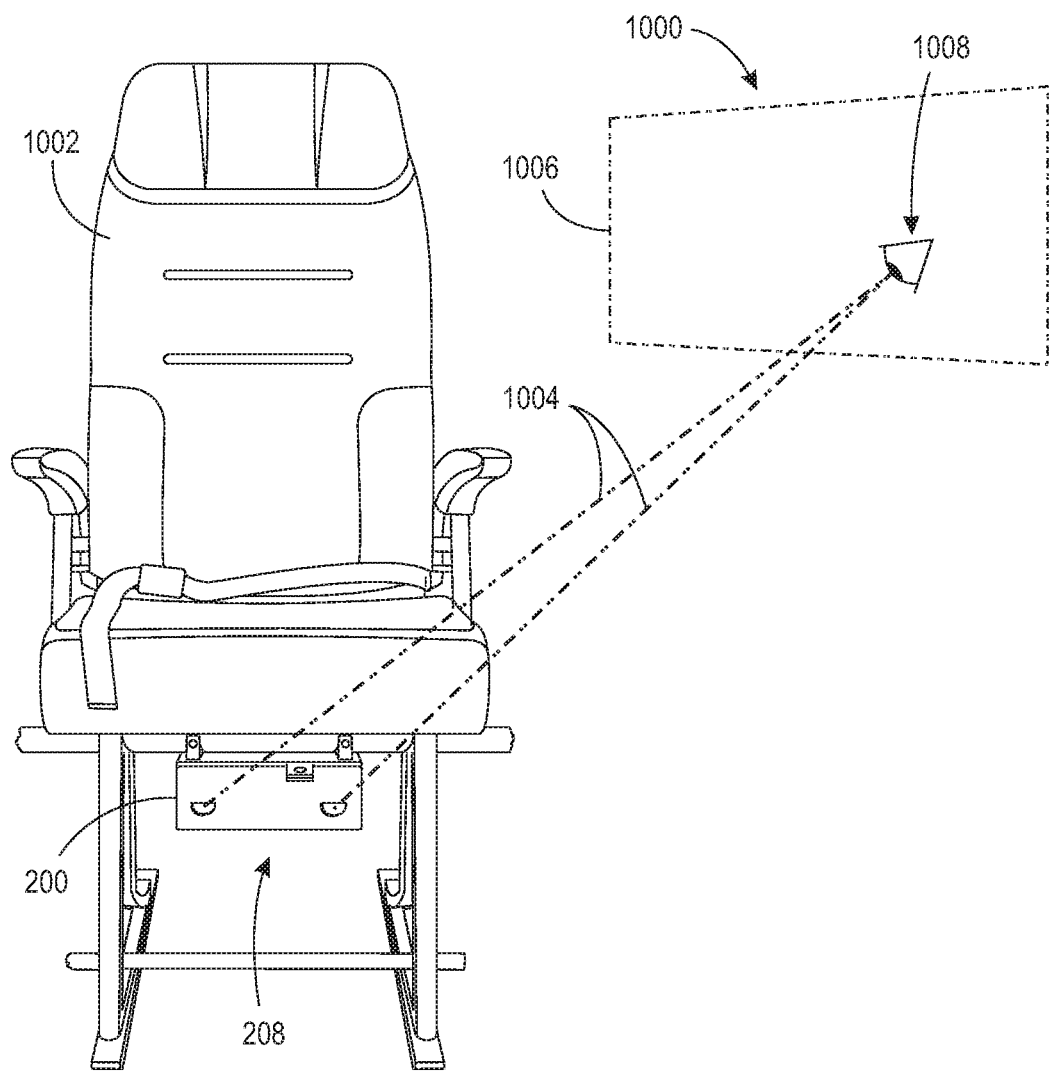
FIG. 10 is a perspective depiction of an inspection of an indicator assembly of a stowage container.

FIG. 10 is a perspective depiction of a visual inspection 1000 of at least one indicator assembly 208 of a stowage container 200 that is attached to a seat 1002 of a vehicle such as aircraft 900 (FIG. 9). When the stowage container 200 is positioned, for example, under a passenger seat 1002, a breached or unbreached state of the stowage container 200 can be detected visually 1004 across a field of view 1006 and from a predetermined eyepoint 1008 selected from one of a plurality of eyepoints within the field of view 1006 by a standing adult, for example from an aisle 804 (FIG. 8) or within a row of an aircraft, without requiring an inspector to unduly bend, stoop, use a viewing aid such as a mirror, or reposition other structures such as an armrest. The field of view 1006 includes a plurality of different eyepoints that allows the adult to view and inspect the indicator assembly 208 of the stowage container 200. The field of view 1006 may be, for example, a 12 inch by 12 inch visual window that lies between a height of 34 inches and 57 inches from the floor, and no closer than 5 inches to the aisle-side armrest. This allows an adult such as an inspector to visually inspect a breached or unbreached state of the indicator assembly 208 across a range of postures from standing to bending. The field of view 1006 can include a predetermined viewing eyepoint 1008 or range of eyepoints, and can be determined, at least in part, by a pitch of the passenger seat 1002 and the design and location of the stowage container 200.

Various implementations of the present teachings thus provide an indicator assembly that monitors and indicates whether a barrier such as a door or panel has been breached. In a first or armed state, the indicator assembly indicates that the barrier has not been breached. Upon moving the barrier from a first position (such as a closed position) toward or to a second position (such as an open position), the indicator assembly adjusts from the first state to a second or unarmed state, which indicates that the barrier has been breached. Upon returning the barrier back to the closed position, the indicator assembly remains in the second state until the indicator assembly is moved by authorized personnel. The indicator assembly provides a device, gauge, indicium, or display which, upon visual inspection, indicates whether the barrier is in a sealed or unopened state, or in an unsealed, opened, or breached state. The indicium can be an indicator that has a first visibility when the barrier is in an unbreached state and a second visibility when the barrier is in a breached state, where the second visibility is greater than the first visibility. The indicator assembly is a mechanical device that requires no electrical power to operate.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, after reading this disclosure, it will be appreciated that while the process is described as a series of acts or events, the present teachings are not limited by the ordering of such acts or events. Some acts can occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein can be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed can be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for detecting tampering with a stowage container in an aircraft, comprising:

positioning the stowage container in the aircraft, the stowage container comprising a container housing and a barrier, wherein edges of the barrier overlap edges of the container housing to prevent access to an interior of the stowage container when the barrier is in a closed position, wherein the barrier comprises a front panel and a back panel that define a slot therebetween, and wherein the front panel comprises a front panel window; and positioning a tamper-evident device in the slot, wherein the tamper-evident device is not visible through the front panel window when the stowage container is in a first state, and wherein the tamper-evident device is visible through the front panel window when the stowage container is in a second state, wherein the tamper-evident device defines a notch, and wherein the container housing comprises a post that is positioned at least partially in the notch when the stowage container is in the first state.

2. The method of 1, wherein the tamper-evident device is manually inaccessible when the barrier is in the closed position and when the barrier is in an open position.

3. A method for detecting tampering with a stowage container in an aircraft, comprising:
positioning the stowage container in the aircraft, the stowage container comprising a container housing and a barrier, wherein edges of the barrier overlap edges of the container housing to prevent access to an interior of the stowage container when the barrier is in a closed position, wherein the barrier comprises a front panel and a back panel that define a slot therebetween, and wherein the front panel comprises a front panel window;
positioning an indicator assembly in the slot, wherein the indicator assembly is not visible through the front panel window when the stowage container is in a first state, and wherein the indicator assembly is visible through the front panel window from a range of eyepoints under an ambient light environment when the stowage container is in a second state, wherein the indicator assembly defines a notch, and wherein the container housing comprises a post that is positioned at least partially in the notch when the stowage container is in the first state; and
configuring the indicator assembly such that the indicator assembly is inaccessible from an exterior of the stowage container and from an interior of the stowage container such that the indicator assembly is inaccessible in both the closed position and an open position, wherein the indicator assembly provides a distinct color contrast with the stowage container and an indication that tampering has occurred.

4. The method of claim 3, further comprising configuring the indicator assembly to be manually inaccessible from the exterior of the stowage container.

5. The method of claim 4, further comprising attaching the stowage container to a seat of the aircraft.

6. The method of claim 3, wherein the positioning of the indicator assembly comprises positioning the indicator assembly to be viewable by a standing adult from an aisle of the aircraft.

7. The method of claim 3, wherein the positioning of the indicator assembly further comprises positioning the indicator assembly to be viewable by an adult in any posture from standing to bending.

8. A method for detecting tampering with a stowage container in an aircraft, comprising:
positioning a tamper-evident device in a barrier of the stowage container, wherein the tamper-evident device is not visible through a front panel window of the barrier when the stowage container is in a first state, and wherein the tamper-evident device is visible through the front panel window when the stowage container is in a second state, and wherein the tamper-evident device defines a notch that is configured to receive a post when the stowage container is in the first state.

9. The method of claim 8, further comprising positioning the tamper-evident device to be viewable from at least one predetermined eyepoint under an ambient light environment.

10. The method of claim 9, further comprising attaching the stowage container to the aircraft.

11. The method of claim 10, further comprising positioning the stowage container such that the tamper-evident device is viewable by a standing adult from an aisle of the aircraft.

12. The method of claim 11, wherein the positioning of the tamper-evident device further comprises positioning the tamper-evident device to be viewable by an adult in any posture from standing to bending.

13. The method of claim 11, wherein the positioning of the tamper-evident device further comprises positioning the tamper-evident device to be viewable under the ambient light environment without use of either a flashlight or a mirror.

14. The method of claim 8, further comprising attaching the stowage container to a seat of the aircraft.

15. The method of claim 8, wherein the tamper-evident device provides a color contrast with the stowage container when in the second state.

16. The method of claim 8, wherein the barrier comprises a front panel and a back panel that define a slot therebetween, and wherein the tamper-evident device is positioned at least partially within the slot.

17. The method of claim 16, wherein the post extends substantially horizontally into the notch, and wherein, as the barrier moves through an arc, the post is withdrawn from the notch, causing the tamper-evident device to move within the slot due to gravity to make the tamper-evident device visible.

18. The method of claim 16, wherein the back panel is visible through the front panel window when the stowage container is in the first state, and wherein the back panel is not visible through the front panel window when the stowage container is in the second state.

19. The method of claim 16, wherein the back panel comprises a back panel window, wherein the post extends at least partially through the back panel window when the stowage container is in the first state, and wherein the post does not extend through the back panel window when the stowage container is in the second state.

20. The method of claim 8, wherein the tamper-evident device comprises a hook that at least partially defines the notch, and wherein the tamper-evident device hangs by the hook from the post when the stowage container is in the first state.

* * * * *